United States Patent
Kim et al.

(10) Patent No.: US 9,497,235 B2
(45) Date of Patent: Nov. 15, 2016

(54) DETERMINING CAPACITY OF VIRTUAL DEVICES IN A VOICE OVER INTERNET PROTOCOL SYSTEM

(71) Applicant: ShoreTel, Inc., Sunnyvale, CA (US)

(72) Inventors: Dohoon Kim, Cupertino, CA (US); Howard Yin, Saratoga, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 33 days.

(21) Appl. No.: 14/291,444

(22) Filed: May 30, 2014

(65) Prior Publication Data
US 2015/0350080 A1    Dec. 3, 2015

(51) Int. Cl.
  *H04M 7/00*   (2006.01)
  *H04L 29/06*  (2006.01)
  *H04L 12/26*  (2006.01)

(52) U.S. Cl.
  CPC ......... *H04L 65/403* (2013.01); *H04L 43/0817* (2013.01); *H04L 65/1046* (2013.01); *H04L 65/1059* (2013.01); *H04L 65/80* (2013.01)

(58) Field of Classification Search
  CPC ... H04L 12/1822; H04L 65/00; H04L 67/38; H04L 12/1827; H04L 65/4038; H04L 47/70; H04L 67/1097; H04L 63/20; H04L 69/08; H04M 3/567; G06F 9/5077
  See application file for complete search history.

(56) References Cited

U.S. PATENT DOCUMENTS

| | | | |
|---|---|---|---|
| 2006/0203807 A1* | 9/2006 | Kouretas et al. | 370/352 |
| 2008/0317238 A1* | 12/2008 | Cai et al. | 379/220.01 |
| 2009/0225747 A1 | 9/2009 | Madabhushi et al. | |
| 2011/0271197 A1* | 11/2011 | Jones et al. | 715/739 |
| 2012/0044817 A1 | 2/2012 | Harper et al. | |
| 2012/0044931 A1 | 2/2012 | Harper et al. | |
| 2014/0052864 A1* | 2/2014 | Van Der Linden et al. | 709/226 |
| 2014/0056296 A1 | 2/2014 | Madabhushi et al. | |

* cited by examiner

*Primary Examiner* — Jung-Jen Liu
(74) *Attorney, Agent, or Firm* — The Mueller Law Office, P.C.

(57) ABSTRACT

A method for determining a capacity of a virtual machine configured as a telephony device in a VoIP system includes determining a resource configuration of the virtual machine including a number of CPU cores, a CPU clock rate, or a memory size. The virtual machine may be configured as a trunk, conference bridge, phone switch, session border controller, router, or another device in the VoIP system. The method also includes sending the resource configuration from the virtual machine to a VoIP system configuration application. The VoIP system configuration application may be an application running on the virtual machine or an application running on a server separate from the virtual machine. At the VoIP system configuration application, a capacity of the virtual machine is determined based on the resource configuration. The capacity determines a number and type of telephony features supported by the telephony device in the VoIP system.

16 Claims, 5 Drawing Sheets

DETERMINING CAPACITY OF VIRTUAL DEVICES IN A VOICE OVER INTERNET PROTOCOL SYSTEM

FIELD OF INVENTION

Embodiments described herein relate generally to determining capacity of virtual machines in Voice over Internet Protocol (VoIP) systems.

BACKGROUND

Virtualization is increasingly important for a number of different technologies and for a number of different reasons. In VoIP systems, for example, virtualization is increasingly important because it enables reduced costs and increased flexibility. Costs are reduced in part because companies are able to focus on software applications without having to worry about hardware integration. Also, because virtual machines are software based, scaling considerations become non-issues in many instances. Flexibility is increased because features and/or capacity can often be added with simple software changes as opposed to also requiring hardware changes. Reduced costs and increased flexibility can also result from centralized and/or cloud-based deployments. These reasons can be compelling, especially for growing companies that face scaling concerns, or for small companies that need access to certain features without incurring prohibitive costs.

Because of the increasing importance of virtualization, improved methods for implementing virtualization in VoIP systems are constantly desired.

SUMMARY

Embodiments described herein provide improved methods for using virtual machines in VoIP systems. In an embodiment, for example, a capacity of a virtual machine can be determined automatically based on the resources allocated to the virtual machine. The capacity can determine the number and type of features supported by the virtual machine in the VoIP system.

As an example, in accordance with an embodiment, a method for determining a capacity of a virtual machine configured as a telephony device in a VoIP system includes determining a resource configuration of the virtual machine including at least one of a number of central processing unit (CPU) cores, a CPU clock rate, or a memory size. The resource configuration may be determined at the virtual machine. The virtual machine may be configured as a trunk, a conference bridge, a phone switch, a session border controller, a router, or another device in the VoIP system. The method also includes sending the resource configuration from the virtual machine to a VoIP system configuration application. The VoIP system configuration application may be an application running on the virtual machine or an application running on a server separate from the virtual machine. At the VoIP system configuration application, a capacity of the virtual machine is determined based on the resource configuration. The capacity determines a number and type of telephony features supported by the telephony device in the VoIP system.

In an embodiment, the memory size includes at least one of random access memory (RAM) or hard disk memory allocated to the virtual machine.

In another embodiment, the virtual machine is configured as a phone switch, and the capacity determines at least one of a number of phones supported by the phone switch, a number of hunt groups supported by the phone switch, a number of workgroups supported by the phone switch, a number of backup auto attendant menus supported by the phone switch, a number of make-me conference sessions supported by the phone switch, or a number of bridged call appearance extensions supported by the phone switch.

In another embodiment, the virtual machine is configured as a trunk, and the capacity determines a number of SIP trunks supported by the trunk.

In another embodiment, the virtual machine is configured as a conference bridge, and the capacity determines at least one of a number of audio conference ports supported by the conference bridge, a number of web conference ports supported by the conference bridge, or a number instant messaging users supported by the conference bridge.

In another embodiment, the virtual machine is configured as a conference bridge, and the resource configuration of the virtual machine is changed to a new resource configuration. The method also includes determining the new resource configuration of the virtual machine at the virtual machine. The new resource configuration is sent from the virtual machine to the VoIP system configuration application. At the VoIP system configuration application, a new capacity of the virtual machine is determined based on the new resource configuration. The new capacity determines a new number of conference ports supported by the conference bridge that is different from the number of conference ports supported by the conference bridge.

In some embodiments, the number of conference ports may include a number of audio conference ports, a number of video conference ports, or a number of web conference ports. In other embodiments, the capacity may also determine at least one of a number instant messaging users supported by the conference bridge, a number of conference calls supported by the conference bridge, or a number of conference recordings supported by the conference bridge.

In yet another embodiment, the virtual machine is assigned to a site of a plurality of sites in the VoIP system. The site assignments may be made at the VoIP system configuration application and may determine a primary association between endpoints and service devices in the VoIP system.

Numerous benefits are achieved using embodiments described herein over conventional techniques. For example, in some embodiments, a capacity of a virtual machine in a VoIP system can be determined based on the resources allocated to the virtual machine. In such an embodiment, scale may be primarily determined by computing power and memory of the virtual machine. This can reduce costs and improve flexibility of VoIP systems. In other embodiments, the capacity of the virtual machine in a VoIP system may be sent automatically from the virtual machine to a system configuration application running on a separate server. In such an embodiment, interaction by an administrator of the VoIP system is not required and reliability of the system is increased. Depending on the embodiment, one or more of these benefits may exist. These and other benefits are described throughout the specification.

DETAILED DESCRIPTION

Embodiments described herein provide improved methods for automatically determining a capacity of a virtual machine based on the resources allocated to the virtual machine. The resources allocated to the virtual machine may include computing power and memory. The capacity of the virtual machine may determine the number and type of features supported by the virtual machine. For example, the capacity of a virtual machine configured as a conference bridge may determine a number of ports (audio, video, and/or web) supported by the conference bridge, and the capacity of a virtual machine configured as a phone switch may determine a number of phones supported by the phone switch. Other types of virtual machines supporting other features may also be provided as described more fully below.

Figure 1:
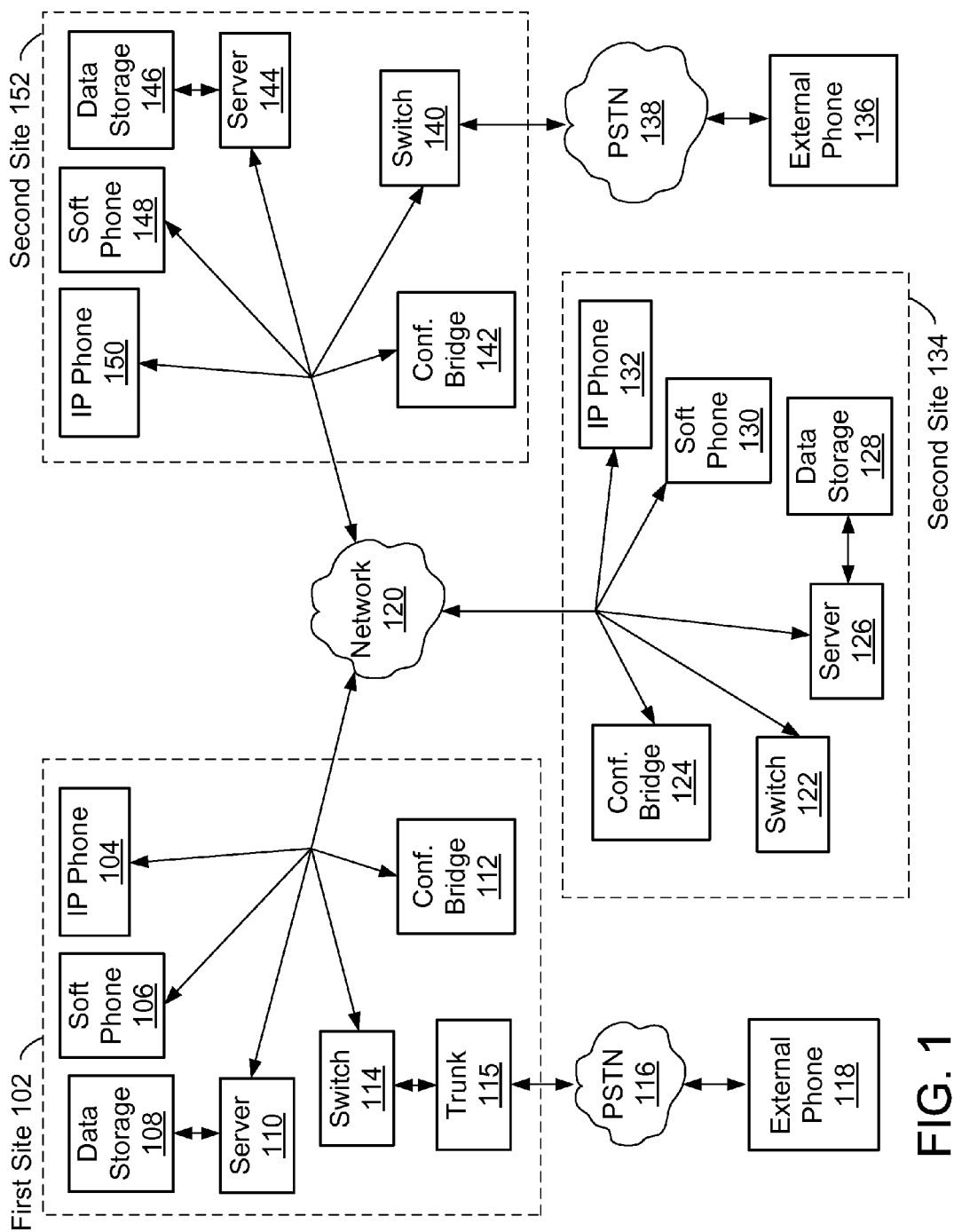
FIG. 1 is a simplified diagram of an exemplary VoIP system in which some embodiments may be implemented.

FIG. 1 is a simplified diagram of an exemplary VoIP system in which some embodiments described herein may be implemented. The system illustrated in FIG. 1 includes three groupings of devices labeled as first site 102, second site 134, and third site 152. As used herein, a site represents a grouping (e.g., a physical or logical grouping) of resources. The resources may be grouped according to location, in which case different sites may be physically distinct from each other, or they may be grouped based on other factors, in which case different sites may or may not be physically distinct from each other. Site assignments may be used to determine primary and backup associations between the devices in the VoIP system. Assignments to provide resources within the VoIP system may be made based on a capacity of a device and a current use (or load) on the device.

While the system illustrated in FIG. 1 has three sites that each include similar devices, embodiments of the present invention are not limited to this configuration. For example, embodiments may be implemented in systems with more or fewer than three sites, and each site may include different devices and configurations compared to the other sites in the system.

In this example, the first site 102, the second site 134, and the third site 152 are each communicatively coupled via a network 120. The network 120 may be the Internet or another packet switched network over which the VoIP system operates.

The first site 102 includes several devices including a server 110, a conference bridge 112, a switch 114, and a trunk 115. The first site 102 also includes communication devices such as an Internet Protocol (IP) phone 104 and a soft phone 106. Also included within the first site 102 is a data storage device 108. Each of these devices may communicate with each other via the network 120 or via a local network.

The server 110 may be configured to provide some of the applications in the VoIP system. For example, the server 110 may be configured to provide applications such as auto attendant features, media on hold (MOH), voicemail services, and the like. The server 110 may store data in local memory or in the data storage 108.

In an embodiment, the server 110 may be linked directly to the data storage 108 as shown in FIG. 1. In another embodiment, the server 110 may be linked to the data storage 108 via the network 120 or a local network. The data storage 108 is configured to store and maintain data. The data storage 108 may be any conventional storage device or database, such as those powered by My SQL, Oracle, Sybase, and the like, or any other data source such as an LDAP server.

The conference bridge 112 may be configured to link participants (e.g., users of IP phones 104, 132, 150; soft phones 106, 130, 148; and/or other endpoints) in a conference call and enable the sharing of resources between the participants. A conference bridge may also provide conferencing services such as recording and reporting functions. A conference bridge typically includes a number of ports each configured to provide one or more resources (e.g., audio, video, web and/or the like) to a conference participant. The number of participants that can join a conference call is typically limited by the number and configuration of the ports on the conference bridge hosting the conference combined with other hardware and software limitations (e.g., CPU resources, available memory, and the like).

The switch 114 may be a telephone switch that communicates with the IP phone 104 and the soft phone 106 to establish communications channels that are used to make and receive calls. As used herein, the term calls refers broadly to any type of communications (e.g., phone calls, conference calls, video calls, text messaging, or other communications). The switch 114 may manage call setup and resource allocation by provisioning extensions for the IP phone 104 and the soft phone 106. In the example illustrated in FIG. 1, the switch 114 is also coupled to the trunk 115. The switch 114 may be coupled directly to the trunk 115 or they may be coupled via the network 120 or a local network.

Other communication devices that are used to make or receive calls may also be included within the VoIP system and within each site. For example, although not shown in this example, a VoIP system may include analog or digital phones, button boxes, "virtual phones" (e.g. extensions that are not assigned to a specific device), and other communication devices. Both fixed and mobile devices may be part of the VoIP system. Moreover, such devices may be part of the VoIP system temporarily or on a more permanent basis. For example, a desktop phone at an enterprise may be a more permanent part of a VoIP system. Alternatively, a mobile device may be part of a VoIP system on a more transient basis, such as when the mobile device is at a particular location and/or during a certain period of time. Additionally, a user may use a call manager program to make, receive, and manage calls on the VoIP system. Such a program may run on a user's phone or on a separate device.

The trunk 115 may be an analog, digital, or IP trunk (e.g., a session initiation protocol (SIP) trunk). In the illustrated configuration, the trunk 115 provides an interface between the VoIP system and the public switched telephone network (PSTN) 116. The trunk 115 facilitates inbound and outbound calls between endpoints within the VoIP system (e.g., IP phones 104, 132, 150 and softphones 106, 130, 148) and endpoints accessible via the PSTN 116 (e.g., external phone 118) or via other telephony systems.

The server 110, conference bridge 112, switch 114, and trunk 115 typically include familiar software and hardware components. For example, they may include operating systems, processors, local memory for storage, I/O devices, and system buses interconnecting the hardware components. RAM and disk drives are examples of local memory for storage of data and computer programs. Other types of local memory include magnetic storage media, optical storage media, flash memory, networked storage devices, and the like.

In some embodiments, the server 110 may include more than one server (e.g. a server cluster). Also, in some embodiments the server 110 may be configured to implement some or all of the features that are normally provided by the conference bridge 112, the switch 114, and/or the trunk 115. Alternatively, the switch 114 may be configured to implement some or all of the features that are normally provided by the server 110, the conference bridge 112, and/or the trunk 115.

In the VoIP system illustrated in FIG. 1, the second site 134 includes several devices including a server 126, a conference bridge 124, and a switch 122. The second site 134 also includes communication devices such as an IP phone 132 and a soft phone 130. Also included within the second site 134 is a data storage device 128. Similar to the devices within the first site 102, each of these devices may communicate with each other via the network 120 or via a local network. Each of the devices within the second site 134 may be configured in a manner similar to the corresponding devices within the first site 102 described above.

In a similar manner, the third site 152 includes several devices including a server 144, a conference bridge 142, and a switch 140. The third site 152 also includes communication devices such as an IP phone 150 and a soft phone 148. Also included within the third site 152 is a data storage device 146. Similar to the devices within the other sites, each of the devices within the third site 152 may communicate with each other via the network 120 or via a local network. Each of the devices within the third site 152 may be configured in a manner similar to the corresponding devices within the first site 102 described above.

The switch 140 at the third site 152 is coupled to PSTN 138. In the illustrated configuration, the switch 140 provides an interface between the VoIP system and the PSTN 138. The switch 140 may be coupled to the PSTN 138 via a trunk (like trunk 115 at first site 102) or via another interface such as a primary rate interface (PRI). The PSTN 138 may be the same or a different telephony system as the PSTN 116. The PSTN 138 may provide access to various communication devices such as external phone 136.

FIG. 1 is presented merely as an exemplary VoIP system to illustrate some of the features and functionality of the present invention. Not all distributed VoIP systems include the devices shown in FIG. 1. Likewise, some distributed VoIP systems include additional devices that are not shown. For example, in some configurations, the devices shown in FIG. 1 may be combined or provide functionality that is different from that described herein. Thus, the present invention can be embodied in many different forms and should not be construed as limited to the configurations set forth herein.

In accordance with some embodiments, virtual machines may be used to replace devices in systems such as the VoIP system illustrated in FIG. 1. Examples of some of the devices in a VoIP system that may be replaced by one or more virtual machines include conference bridges, phone switches, trunks, session border controllers, routers, and the like. One of the benefits of virtual machines is that scale is essentially determined by the computing power and memory of the virtual machine, so a single virtual machine could in theory seamlessly scale from very small to very large capacities.

Figure 2:
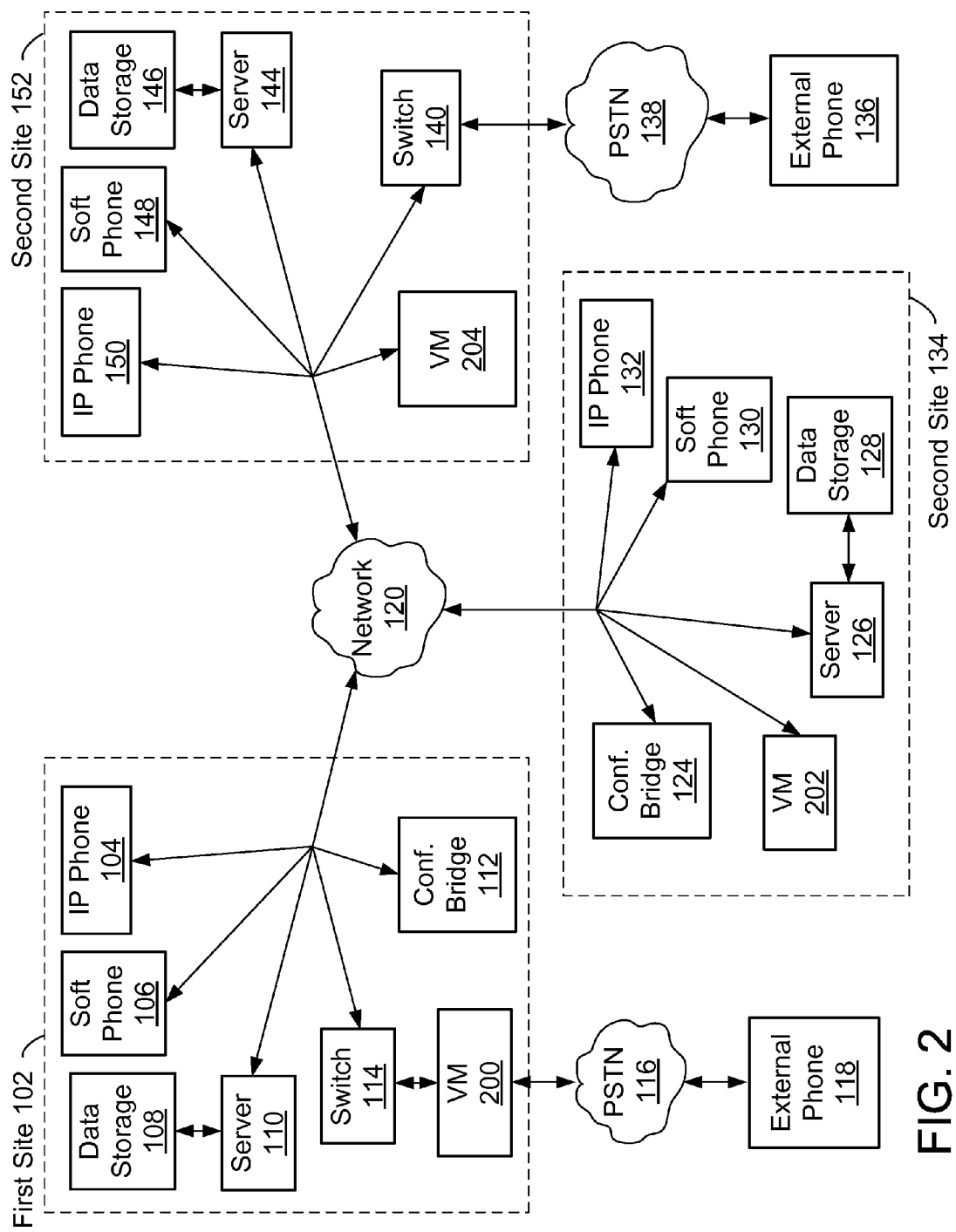
FIG. 2 is a simplified diagram of an exemplary VoIP system with virtual machines in accordance with some embodiments.

FIG. 2 provides an example of a VoIP system where some of the devices have been replaced with virtual machines. Compared with FIG. 1, the trunk 115 at the first site 102 has been replaced with a virtual machine (VM) 200, the switch 122 at the second site 134 has been replaced with VM 202, and the conference bridge 142 at the third site 152 has been replaced with VM 204.

The VM's 200, 202, 204 are each software-based emulations of the devices they replace and typically include familiar software and hardware components. For example, they may include operating systems, processors, local memory for storage, I/O devices, and system buses interconnecting the hardware components. In addition to the familiar software components, the VM's 200, 202, 204 may each include specific software applications that provide the features and functionality of the devices they replace. For example, the VM 200 includes software applications that provide the features and functionality of a trunk, the VM 202 includes software applications that provide the features and functionality of a phone switch, and the VM 204 includes software applications that provide the features and functionality of a conference bridge. Some of the features and functionality of trunks, phone switches, and conference bridges have been described above.

It should be appreciated that FIG. 2 is used merely as an example, and any or all of the devices shown in this example could be replaced by virtual machines (e.g. servers 110, 126, 144; conference bridges 112, 124; and switches 114, 140). Also, a single virtual machine could be used to replace each of the devices, or a virtual machine could be used as a system platform to replace multiple devices. The VM's 200, 202, 204 could be based on any known virtual platform such as those offered by VMWare or Microsoft.

The VM's 200, 202, 204 do not have inherent capacity limitations like the devices they replace. For example, a hardware-based SIP trunk may be designed to support some maximum number of trunk lines based on its software and hardware configuration. Similarly, a hardware-based switch may be designed to support some maximum number of endpoints and/or trunks, and a conference bridge may designed to support some maximum number of conference ports. Other features provided by the devices may have capacity limitations as well. Also, for some devices, the capacity may be feature dependent. As an example, the capacity of a conference bridge may be different for audio ports, video ports, and web ports.

In contrast to their hardware-based counterparts, the capacity of each of the VM's 200, 202, 204 is dependent on the computing resources allocated to the particular virtual machine. In an embodiment, the resources allocated to a virtual machine may include a number of CPU cores, CPU clock rate, and/or memory size. The memory size may include RAM and/or hard disk memory. The capacity of the VM's 200, 202, 204 may be further limited to enforce user licenses.

In some embodiments, the VM's 200, 202, 204 may determine specific capacity limitations. In other embodiments, the capacity limitations may be determined and enforced by a separate device such as a server (e.g., one or more of the servers 110, 126, 144). As an example, in an embodiment, a software-based application, such as a VoIP system configuration application, may determine the capacity of each of the VM's 200, 202, 204 based on resources allocated to the VM's 200, 202, 204. The VoIP system configuration application may be an application running on the virtual machine, or an application running on a server in the VoIP system. Further, the VoIP system configuration application may monitor and/or enforce limits based on the capacity and/or based on user licenses.

Figure 3:
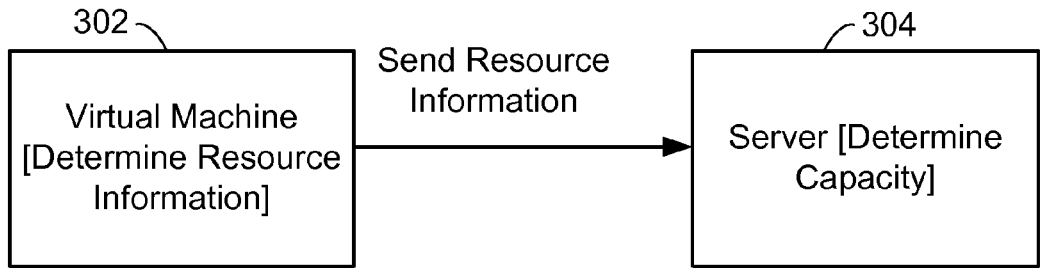
FIG. 3 is a simplified diagram of a virtual machine providing resource information to a server that determines capacity in accordance with some embodiments.

In some embodiments, a system administrator may provide resource information about each of the VM's 200, 202, 204 to the VoIP system configuration application. In other embodiments, the VM's 200, 202, 204 may be configured in accordance with known techniques to automatically send resource information to the VoIP system configuration application. This is illustrated in FIG. 3, where a virtual machine 302 determines its resouce information and sends the resource information to a server 304 (or to an application running on the server). The application determines the capacity of the virtual machine 302 based on the resource information. Alternatively, the application may be a separate application running on the virtual machine.

The resource information may be determined and sent at start-up, reboot, or initialization of the virtual machine; after any changes to the allocated resources (e.g., hardware upgrade, modification of resource allocation, or the like); or the resource information may be reported on a periodic basis. Allocated resources may be changed by changing the number of CPU cores, the CPU clock rate, and/or the memory size allocated to the virtual machine. In response to receiving the resource information (either initial or updated), the VoIP system configuration application may determine capacity limits. Alternatively, the virtual machine may be configured to determine its capacity based on the resource information and report the capacity to the VoIP system configuration application.

In some embodiments, the capacity may be determined using a predefined matrix. The matrix may define capacities based on resources allocated to the virtual machine. Matrixes may be stored at the virtual machine, at a server in the VoIP system, or at a remote data storage. Exemplary matrixes for some virtual machines are provided in TABLES 1-2 below.

TABLE 1

Exemplary Matrix for Virtual Phone Switch

| # Phones | Up to 250 | Up to 500 | Up to 1000 | Up to 2000 |
|---|---|---|---|---|
| Memory | ≥1.5 G | ≥2 G | ≥2.5 G | ≥3 G |
| CPU/Cores | <½ core | ≥2.5 GHz | ≥3 GHz | ≥3 GHz |
|  |  | ≥½ core | ≥1 core | ≥2 cores |
| Disk Space | ≥10 G | ≥15 G | ≥20 G | ≥25 G |

TABLE 2

Exemplary Matrix for Virtual SIP Trunk

| # SIP Trunks | Up to 100 | Up to 200 | Up to 500 |
|---|---|---|---|
| Memory | ≥1.5 G | ≥2 G | ≥2.5 G |
| CPU/Cores | ≥2.5 GHz | ≥2.5 GHz | ≥3 GHz |
|  | ≥4 cores | ≥8 cores | ≥16 cores |
| Disk Space | ≥10 G | ≥20 G | ≥30 G |

In additional to the capacity limitations listed in the matrixes above, other features provided by the virtual machines may have capacity limitations as well that may be included in the same or different matrixes. For example, based on allocated resources, a virtual phone switch may support some maximum number of hunt groups, workgroups, backup auto attendant menus, and the like. Hunt groups may allow inbound calls to be automatically routed to multiple extensions until the call is answered. Workgroups may associate a single extension with a group of phones, allowing inbound calls to be distributed to members of the group. The backup auto attendant menus may be used when primary auto attendance menus provided by a server are unavailable.

Similarly, a virtual conference bridge may have limits on a maximum number of audio conference ports, video conference ports, web conference ports, and instant messaging users, as well as limits on services such as recording, reporting, and the like. The maximum number for some features may be zero if resources are limited (i.e., the feature is not supported).

In some embodiments, the resources allocated to a virtual machine may be modified automatically, either by the VoIP system configuration application or by the virtual machine itself, so that sufficient resources are available to support a particular capacity or to support a current use of the virtual machine. In other embodiments, the resources allocated to a virtual machine can be modified by a system administrator.

Figure 4:
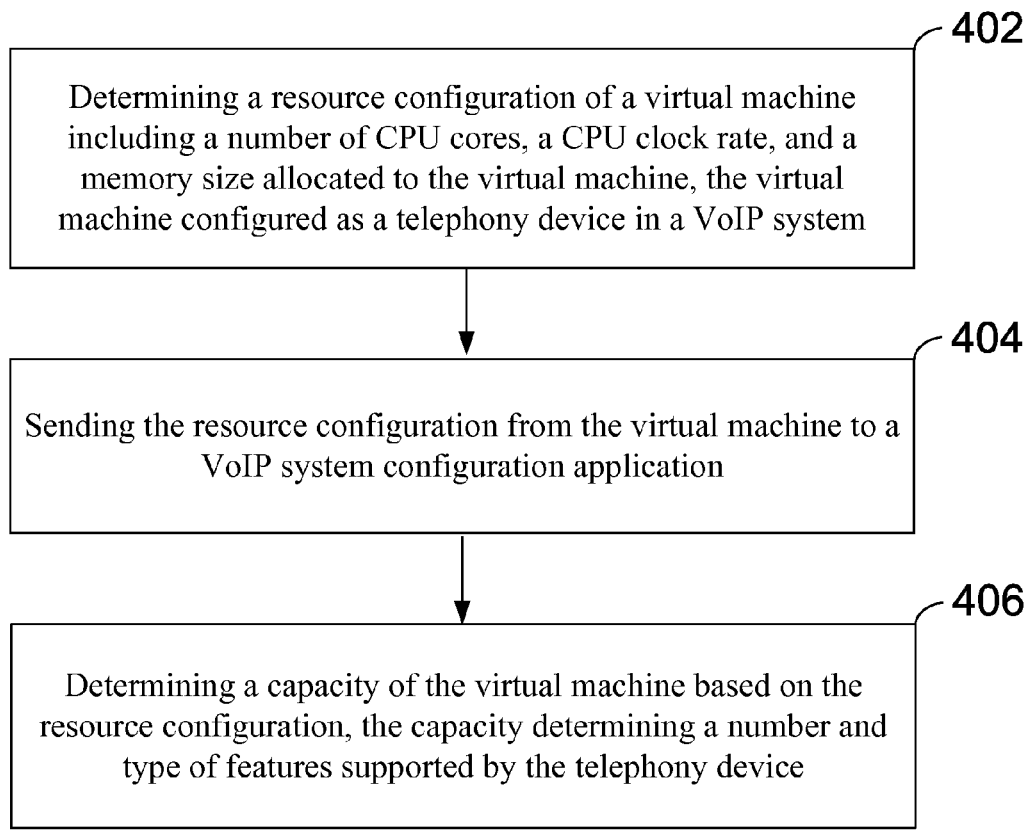
FIGS. 4-6 are flowcharts providing methods for determining capacity of virtual machines in VoIP systems in accordance with some embodiments.

FIG. 4 is flowchart providing a method for determining capacity of a virtual machine configured as a telephony device in a VoIP system in accordance with some embodiments. The method includes determining a resource configuration of the virtual machine including a number of CPU cores, a CUP clock rate, and a memory size allocated to the virtual machine (402). The memory size may include RAM and/or hard disk memory allocated to the virtual machine. The resource configuration is sent from the virtual machine to a VoIP system configuration application (404). The VoIP system configuration application may be an application running on the virtual machine or an application running on a server separate from the virtual machine. A capacity of the virtual machine is determined based on the resource configuration, where the capacity determines a number and type of features supported by the telephony device (406).

The virtual machine may be configured as a conference bridge, phone switche, trunk, session border controller, router, or the like. If configured as a conference bridge, the type of features supported may include audio conference ports, video conference ports, web conference ports, and/or instant messaging.

If configured as a phone switch, the type of features supported may include hunt groups, workgroups, backup auto attendant menus, make-me conference sessions, and/or bridged call appearance extensions. Make-me conference sessions may be conferences initiated from a phone switch for small conferences (typically ≤3 participants). Bridged call appearance extensions may be extensions that are shared among multiple users.

If configured as a trunk, the type of features supported may include SIP trunks.

Figure 5:
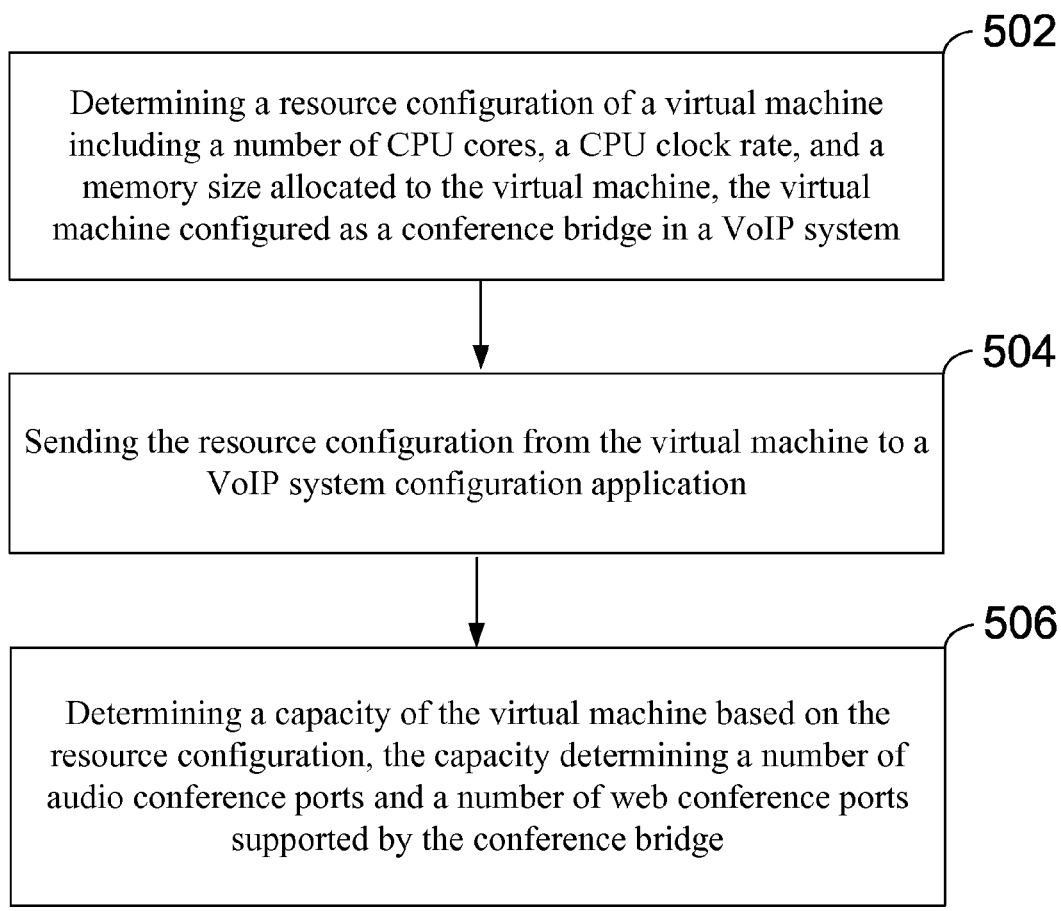

FIG. 5 is flowchart providing a method for determining capacity of virtual machine configured as a conference bridge in accordance with some embodiments. The method includes determining a resource configuration of the virtual machine including a number of CPU cores, a CUP clock rate, and a memory size allocated to the virtual machine (502). The resource configuration is sent from the virtual machine to a VoIP system configuration application (504). The VoIP system configuration application may be an application running on the virtual machine or an application running on a server separate from the virtual machine. A capacity of the virtual machine is determined based on the resource configuration, where the capacity determines a number of audio conference ports and a number of web conference ports supported by the conference bridge (506). The capacity may also determine a number of instant messaging users supported by the conference bridge, a number of conference calls supported by the conference bridge, or a number of conference recordings supported by the conference bridge.

Figure 6:
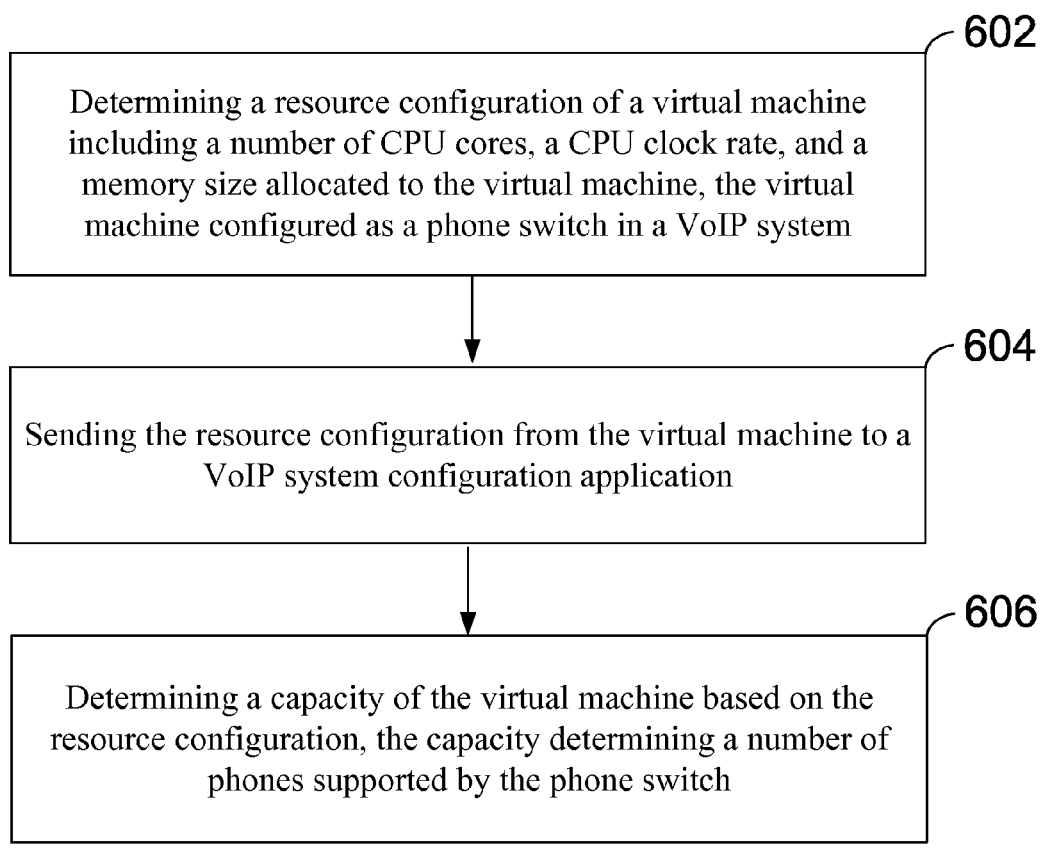

FIG. 6 is flowchart providing a method for determining capacity of virtual machine configured as a phone switch in accordance with some embodiments. The method includes determining a resource configuration of the virtual machine including a number of CPU cores, a CUP clock rate, and a memory size allocated to the virtual machine (602). The resource configuration is sent from the virtual machine to a VoIP system configuration application (604). The VoIP system configuration application may be an application running on the virtual machine or an application running on a server separate from the virtual machine. A capacity of the virtual machine is determined based on the resource configuration, where the capacity determines a number of phones supported by the phone switch (606). The capacity may also determine a number of hunt groups supported by the phone switch, a number of workgroups supported by the phone switch, a number of backup auto attendant menus supported by the phone switch, a number of make-me conference sessions supported by the phone switch, or a number of bridged call appearance extensions supported by the phone switch.

It should be appreciated that the specific steps illustrated in FIGS. 4-6 provide particular methods according to some embodiments. Other sequences of steps may also be performed according to alternative embodiments. For example, alternative embodiments may perform the steps outlined above in a different order. Moreover, the individual steps illustrated in FIGS. 4-6 may include multiple sub-steps that may be performed in various sequences. Furthermore, additional steps may be added or removed depending on the particular application.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for determining a capacity of a virtual machine in a Voice over Internet Protocol (VoIP) system that includes a plurality of sites, the method comprising:
    at the virtual machine, determining a resource configuration of the virtual machine including a number of central processing unit (CPU) cores, a CPU clock rate, and a memory size allocated to the virtual machine, the virtual machine being a single device configured via one or more software applications as a conference bridge for providing conferencing services;
    sending the resource configuration from the virtual machine to a VoIP system configuration application, the VoIP system configuration application running on a server that is separate from the virtual machine, the resource configuration sent from the virtual machine to the server via a network;
    at the VoIP system configuration application, determining a capacity of the virtual machine based on the resource configuration, the capacity determining a number of conference ports supported by the virtual machine;
    at the VoIP system configuration application, assigning the virtual machine to a site of the plurality of sites in the VoIP system, the assignment determining a primary association between endpoints within the site and the virtual machine, the virtual machine being the only virtual machine within the site for providing the conferencing services; thereafter
    at the virtual machine, determining a new resource configuration of the virtual machine, the new resource configuration resulting from a change in at least one of the number of CPU cores, the CPU clock rate, or the memory size allocated to the virtual machine;
    sending the new resource configuration from the virtual machine to the VoIP system configuration application; and
    at the VoIP system configuration application, determining a new capacity of the virtual machine based on the new resource configuration, the new capacity determining a new number of conference ports supported by the conference bridge that is different from the number of conference ports supported by the conference bridge.

2. The method of claim 1 wherein the resource configuration of the virtual machine is changed to the new resource configuration by changing at least one of the number of CPU cores, the CPU clock rate, or the memory size allocated to the virtual machine.

3. The method of claim 1 wherein the memory size includes at least one of random access memory (RAM) or hard disk memory allocated to the virtual machine.

4. The method of claim 1 wherein the number of conference ports includes at least one of a number of audio conference ports, a number of video conference ports, or a number of web conference ports.

5. The method of claim 1 wherein the capacity also determines at least one of a number instant messaging users supported by the conference bridge, a number of conference calls supported by the conference bridge, or a number of conference recordings supported by the conference bridge.

6. A method for determining a capacity of a virtual machine in a Voice over Internet Protocol (VoIP) system that includes a plurality of sites, the method comprising:
    at the virtual machine, determining a resource configuration of the virtual machine including a number of central processing unit (CPU) cores, a CPU clock rate, and a memory size allocated to the virtual machine, the virtual machine being a single device configured via one or more software applications as a phone switch for providing telephony services;
    sending the resource configuration from the virtual machine to a VoIP system configuration application, the VoIP system configuration application running on a server that is separate from the virtual machine, and the resource configuration sent from the virtual machine to the server via a network;

at the VoIP system configuration application, determining a capacity of the virtual machine based on the resource configuration, the capacity determining a number of phones supported by the virtual machine;

at the VoIP system configuration application, assigning the virtual machine to a site of the plurality of sites in the VoIP system, the assignment determining a primary association between phones within the site and the virtual machine, the virtual machine being the only virtual machine within the site for providing the telephony services; thereafter at the virtual machine, determining a new resource configuration of the virtual machine, the new resource configuration resulting from a change in at least one of the number of CPU cores, the CPU clock rate, or the memory size allocated to the virtual machine;

sending the new resource configuration from the virtual machine to the VoIP system configuration application; and at the VoIP system configuration application, determining a new capacity of the virtual machine based on the new resource configuration, the new capacity determining a new number of phones supported by the virtual machine that is different from the number of phones supported by the virtual machine.

7. The method of claim 6 wherein the memory size includes at least one of random access memory (RAM) or hard disk memory allocated to the virtual machine.

8. The method of claim 6 wherein the capacity also determines at least one of a number of hunt groups supported by the phone switch, a number of workgroups supported by the phone switch, a number of backup auto attendant menus supported by the phone switch, a number of make-me conference sessions supported by the phone switch, or a number of bridged call appearance extensions supported by the phone switch.

9. A method for determining a capacity of a virtual machine in a Voice over Internet Protocol (VoIP) system that includes a plurality of sites, the method comprising:

at the virtual machine, determining a resource configuration of the virtual machine including at least one of a number of central processing unit (CPU) cores, a CPU clock rate, or a memory size, the virtual machine being a single device configured via one or more software applications as a telephony device for providing telephony services;

sending the resource configuration from the virtual machine to a VoIP system configuration application;

at the VoIP system configuration application, determining a capacity of the virtual machine based on the resource configuration, the capacity determining a number and type of telephony features supported by the virtual machine;

at the VoIP system configuration application, assigning the virtual machine to a site of the plurality of sites in the VoIP system, the assignment determining a primary association between devices within the site and the virtual machine, the virtual machine being the only virtual machine within the site for providing the telephony services; thereafter at the virtual machine, determining a new resource configuration of the virtual machine, the new resource configuration resulting from a change in at least one of the number of CPU cores, the CPU clock rate, or the memory size allocated to the virtual machine;

sending the new resource configuration from the virtual machine to the VoIP system configuration application; and at the VoIP system configuration application, determining a new capacity of the virtual machine based on the new resource configuration, the new capacity determining a new number of telephony features supported by the virtual machine that is different from the number of telephony features supported by the virtual machine.

10. The method of claim 9 wherein the memory size includes at least one of random access memory (RAM) or hard disk memory allocated to the virtual machine.

11. The method of claim 9 wherein the virtual machine is configured as a phone switch in the VoIP system.

12. The method of claim 11 wherein the capacity determines at least one of a number of phones supported by the phone switch, a number of hunt groups supported by the phone switch, a number of workgroups supported by the phone switch, a number of backup auto attendant menus supported by the phone switch, a number of make-me conference sessions supported by the phone switch, or a number of bridged call appearance extensions supported by the phone switch.

13. The method of claim 9 wherein the virtual machine is configured as a trunk, and the capacity determines a number of SIP trunks supported by the trunk.

14. The method of claim 9 wherein the virtual machine is configured as a conference bridge.

15. The method of claim 14 wherein the capacity determines at least one of a number of audio conference ports supported by the conference bridge, a number of web conference ports supported by the conference bridge, or a number instant messaging users supported by the conference bridge.

16. The method of claim 9 wherein the virtual machine is configured as either a session border controller or a router.

* * * * *